(12) United States Patent
Okinaka et al.

(10) Patent No.: US 8,896,409 B2
(45) Date of Patent: Nov. 25, 2014

(54) NON-LINEAR RESISTIVE ELEMENT AND MANUFACTURING METHOD THEREOF

(75) Inventors: Hideyuki Okinaka, Toyonaka (JP); Naoyuki Tsukamoto, Amagasaki (JP); Toshihiko Suzuki, Amagasaki (JP); Hiroyuki Otsuki, Amagasaki (JP)

(73) Assignee: Otowa Electric Co., Ltd., Osaka-Shi (JP)

(*) Notice: Subject to any disclaimer, the term of this patent is extended or adjusted under 35 U.S.C. 154(b) by 0 days.

(21) Appl. No.: 13/822,030

(22) PCT Filed: Oct. 5, 2011

(86) PCT No.: PCT/JP2011/072974
§ 371 (c)(1),
(2), (4) Date: Mar. 11, 2013

(87) PCT Pub. No.: WO2012/046765
PCT Pub. Date: Apr. 12, 2012

(65) Prior Publication Data
US 2013/0169405 A1   Jul. 4, 2013

(30) Foreign Application Priority Data
Oct. 5, 2010   (JP) .................................. 2010-225705

(51) Int. Cl.
*H01C 7/10*   (2006.01)
*H01C 7/12*   (2006.01)
*H01C 7/112*  (2006.01)

(52) U.S. Cl.
CPC .. *H01C 7/12* (2013.01); *H01C 7/10* (2013.01); *H01C 7/1006* (2013.01); *H01C 7/112* (2013.01); *Y02E 60/13* (2013.01)
USPC ............................................. 338/21; 338/210

(58) Field of Classification Search
CPC .................................... H01C 7/10; H01C 7/12
USPC .................... 338/21, 210, 296, 212, 211, 287
See application file for complete search history.

(56) References Cited

U.S. PATENT DOCUMENTS

| 3,210,831 A | 10/1965 | Johnson et al. |
| 5,262,754 A * | 11/1993 | Collins ........................... 338/21 |
| 5,519,564 A * | 5/1996 | Carpenter, Jr. ................ 361/127 |
| 6,055,147 A * | 4/2000 | Jeffries et al. .................. 361/103 |
| 6,711,807 B2 * | 3/2004 | Duggal et al. .................. 29/614 |
| 6,794,980 B2 * | 9/2004 | Chu et al. ..................... 338/22 R |
| 2008/0295949 A1 * | 12/2008 | Sakurai et al. ............. 156/89.12 |
| 2009/0179731 A1 * | 7/2009 | Ihle et al. ...................... 338/212 |

FOREIGN PATENT DOCUMENTS

| EP | 2044599 | 4/2009 |
| JP | S52-150751 | 11/1977 |
| JP | 01-216504 | 8/1989 |
| JP | 06-120009 | 4/1994 |
| JP | 2003-059705 | 2/2003 |
| WO | 2008/009282 | 1/2008 |

* cited by examiner

*Primary Examiner* — Kyung Lee
(74) *Attorney, Agent, or Firm* — Rankin, Hill & Clark LLP

(57) ABSTRACT

Provided is a technique to secure compositional or microstructural uniformity of a ceramic sintered body while increasing the area of the ceramic sintered boy, thus improving basic performance including non-linearity, maximum withstand energy and aging characteristics. A plurality of small varistor pieces 11 and insulating resin are kneaded and extruded for shaping, whereby a sheet-form varistor layer 13 can be formed where a plurality of small varistor pieces 11 are spaced from one another and are aligned on the same plane, and the adjacent small varistor pieces 11 are bonded via insulating resin.

8 Claims, 3 Drawing Sheets

NON-LINEAR RESISTIVE ELEMENT AND MANUFACTURING METHOD THEREOF

TECHNICAL FIELD

The present invention relates to a non-linear resistive element that is used for an overvoltage protector such as a surge arrester, a surge absorber or a voltage stabilizing element, the non-linear resistive element including zinc oxides as a primary component and having a resistance value varying with an applied voltage, and relates to a manufacturing method of the non-linear resistive element.

BACKGROUND ART

Non-linear resistive elements generally called a varistor show a characteristic of a resistance value thereof varying with a voltage applied thereto, i.e., have a non-linear voltage-current characteristic such that the element has a high resistance value to show an insulating characteristic when a normal voltage is applied thereto, while having a low resistance value when an abnormal high voltage is applied thereto. Among non-linear resistive elements having such a characteristic, a non-linear resistive element including zinc oxides as a primary component has an excellent non-linear voltage-current characteristic.

Such a non-linear resistive element is manufactured by the following method, for example. That is, a large quantity of zinc oxide as a primary component and a very small quantity of basic additive such as bismuth oxide, antimony oxide, cobalt oxide or manganese oxide to develop a non-linear voltage-current characteristic are wet-mixed, and slurry as a result of the wet-mixing is granulated by spray drying. The granulated powder is shaped into a cylindrical-form compact (green body), and it is sintered to be a ceramic sintered body. Then, a glass material is applied and glazed onto the collaring of the ceramic sintered body to form insulated layers for flashover prevention, to which heat treatment is applied as needed, and electrodes are further formed at upper and lower end faces of the ceramic sintered body by aluminum thermal spraying or the like (see Patent Document 1, for example).

PRIOR ART DOCUMENTS

Patent Documents

Patent Document 1: Japanese Patent Application Laid-Open No. 2003-59705

SUMMARY OF THE INVENTION

Problem to be Solved by the Invention

The varistor voltage of the conventional non-linear resistive element can be controlled by changing the thickness of the ceramic sintered body, and the maximum energy thereof can be controlled by changing the volume of the ceramic sintered body. For instance, in order to obtain a non-linear resistive element of low varistor voltage while keeping high maximum energy, such an element can be realized by thinning the thickness of the sintered body while increasing the cross section area of the sintered body.

The conventional non-linear resistive element, however, has a problematic tendency to be deformed easily as the area of the ceramic sintered body increases, such as heat deformation during sintering because the element is made up of an integrally baked ceramic sintered body. Further, since the ceramic sintered body tends to be broken by external force, the ceramic sintered body having an increased area is likely to be damaged by external force generated during transportation or assembly, posing problems in durability and reliability.

Moreover, the conventional non-linear resistive element is manufactured by sintering the cylindrical-form compact (green body) as a base of the ceramic sintered body. When the compact is prepared, it is difficult to secure the uniformity of the density of the compact (green body) because of friction of the granulated powder or friction between the granulated powder and a die.

Furthermore, in addition to such non-uniformity of the density of the compact due to molding with a die, since there is a temperature difference between the inside and the surface part of the compact during sintering, it becomes further difficult to secure compositional or microstructural uniformity of the sintered body. Especially when the element is very large in size, e.g., when the element is a disk of 10 cm or more in diameter or when the element is a rectangular shape in size equivalent to this, it is difficult to manufacture the conventional non-linear resistive element of such a size, and compositional or microstructural non-uniformity will be worsened greatly and electric characteristics thereof will be degraded remarkably.

In view of these problems, it is an object of the present invention to provide a non-linear resistive element capable of making the overall structural property of a varistor layer uniform and accordingly making electric characteristics such as a non-linear resistive characteristic uniform while increasing the area of the ceramic sintered body, and to provide a manufacturing method thereof.

Means for Solving the Problem

In order to fulfill this object, a non-linear resistive element of the present invention includes: a varistor layer in a sheet form having a surface and a rear face that are parallel to each other; and conductive electrode layers joined to the surface and the rear face of the varistor layer. The varistor layer includes: a plurality of small varistor pieces that are made of a ceramic sintered body and are spaced from one another for alignment, each small varistor piece having a surface and a rear face coinciding with the surface and the rear face of the varistor layer, respectively; and insulating junctions that join the adjacent small varistor pieces.

According to the non-linear resistive element of the present invention, a plurality of small varistor pieces having a constant thickness are spaced from one another for alignment on the same plane (so that the surface and the rear face of the small varistor pieces coincide with the surface and the rear face of the varistor layer, respectively), and the small varistor pieces are joined via the insulating junctions. Therefore, the area of the sheet-form varistor layer can be increased easily.

Small pieces of a compact (green body) as base of the small varistor pieces can be made small so that the sintering conditions including sintering temperatures can be equal at the inside and the outside of the small pieces of the compact (green body). Accordingly, each small varistor piece of the ceramic sintered body as a result of the sintering can have uniform structural properties such as a crystal grain size between the inside and the outside thereof.

With this configuration, compared with the case of an integrally sintered varistor layer as in the conventional element, the overall structural property of a varistor layer can be made uniform while increasing the area of the varistor layer and accordingly electric characteristics such as a non-linear resistive characteristic can be made uniform easily.

In the present invention, preferably, a plurality of the varistor layers and the electrode layers are alternately laminated in a direction perpendicular to the surface and the rear face of the varistor layer. With this configuration, varistor voltage of the element as a whole can be adjusted easily simply by adjusting the number of laminated layers.

In the present invention, preferably, the junctions include synthetic resin having elasticity. With this configuration, since the junctions are deformed elastically, even when external force is applied to the varistor layer, the varistor layer can bend easily compared with the varistor layer made up of an integral ceramic sintered body. As a result, resistance to external force of the varistor layer can be improved.

In the present invention, preferably, the junctions have a part of a thickness smaller than a thickness of a junction interface with the small varistor pieces. With this configuration, the junctions are made of synthetic resin that can be deformed elastically and have a part of a thickness smaller than that of junction interfaces with the small varistor pieces. Accordingly, the flexibility of the varistor layer can be increased as compared with the junctions of the varistor layer having a fixed thickness.

In the present invention, preferably, the electrode layers are provided with a metal fitting for electric connection with others. With this configuration, the non-linear resistive element can be easily connected to a circuit board and the like.

In the present invention, preferably, both end faces of the varistor layer and the electrode layers are covered with a covering resin material. With this configuration, outer periphery end faces of the varistor layer can be protected.

A method for manufacturing a single-layered non-linear resistive element of the present invention includes the steps of: sintering a plurality of small pieces of a compact (green body) as base of ceramic to form the plurality of small varistor pieces having a same thickness; kneading the plurality of small varistor pieces and insulating resin and extruding mixture thereof for shaping to form the sheet-form varistor layer where the plurality of small varistor pieces are spaced from one another and aligned, and the adjacent small varistor pieces are bonded via the insulating resin so that the surface and the rear face of the small varistor pieces coincide with the surface and the rear face of the varistor layer, respectively; and forming the conductive electrode layers so as to be joined to the surface and the rear face of the varistor layer.

A method for manufacturing a multilayered non-linear resistive element of the present invention includes the steps of: sintering a plurality of small pieces of a compact (green body) as base of ceramic to form the plurality of small varistor pieces having a same thickness; kneading the plurality of small varistor pieces and insulating resin and extruding mixture thereof for shaping to form the sheet-form varistor layer where the plurality of small varistor pieces are spaced from one another and aligned, and the adjacent small varistor pieces are bonded via the insulating resin so that the surface and the rear face of the small varistor pieces coincide with the surface and the rear face of the varistor layer, respectively; alternately laminating a plurality of the varistor layers and the conductive electrode layers in a direction perpendicular to the surface and the rear face of the varistor layer to form a lamination; and forming the electrode layers so as to be joined to the surface and the rear face of the lamination.

MODE FOR CARRYING OUT THE INVENTION

Figure 1:
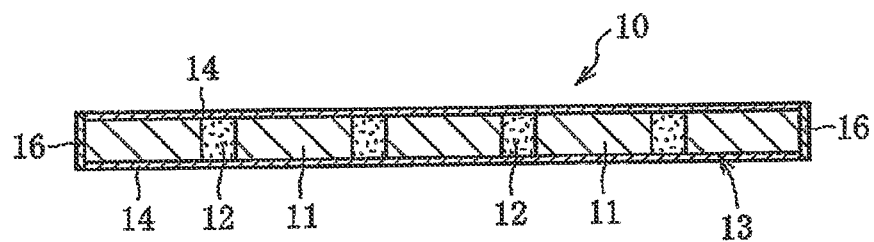
FIG. 1 is a cross-sectional view showing the overall configuration of a single-layered non-linear resistive element that is Embodiment 1 of the present invention.
Figure 2:
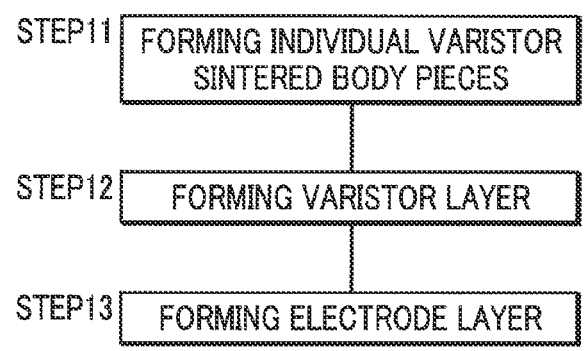
FIG. 2 is a flowchart showing the manufacturing process of the single-layered non-linear resistive element in FIG. 1.

Referring to FIG. 1 and FIG. 2, a non-linear resistive element that is Embodiment 1 of the present invention is described below in detail.

As illustrated in FIG. 1, a single-layered non-linear resistive element 10 of Embodiment 1 is made up of a ceramic sintered body including zinc oxide (ZnO) as a primary component, and includes a varistor layer 13 having main faces and side faces and electrode layers 14 that are made of a conductive material and are attached on the main faces of the varistor layer 13, where the varistor layer 13 has a sheet form where a plurality of small varistor pieces 11 having a constant thickness is aligned on a same plane and the small varistor pieces 11 are bonded to one another via insulating junctions 12 (connector). The side faces of the varistor layer 13 are protected all around by a covering resin material 16.

This non-linear resistive element 10 including zinc oxide as a primary component is configured so that the small varistor pieces 11 having parallel planes and a constant thickness are aligned on the same plane in the horizontal and vertical directions without being overlaid in the direction perpendicular to the alignment direction of the small varistor pieces 11 (the direction perpendicular to the surface and the rear face of the varistor layer 13) and the junctions 12 are present only between the small varistor pieces 11 and are not present on the surface and the rear face of the small varistor pieces 11 so that the small varistor pieces 11 are directly joined to the electrode layers 14.

As illustrated in FIG. 2, this non-linear resistive element 10 may be manufactured by the steps including: dividing a sheet member containing zinc oxide as a primary component into a predetermined size and sintering the divided pieces to form the small varistor pieces 11 having a constant thickness (STEP 11); kneading the small varistor pieces 11 and insulating resin and extruding the mixture thereof for shaping to form the sheet-form varistor layer 13 where the plurality of small varistor pieces 11 aligned on a same plane are bonded via the junctions 12 made of insulating resin (STEP 12); and forming an electrode layer 14 made of a conductive material to each of the main face of the varistor layer 13 for adhesion (STEP 13).

Figure 3:
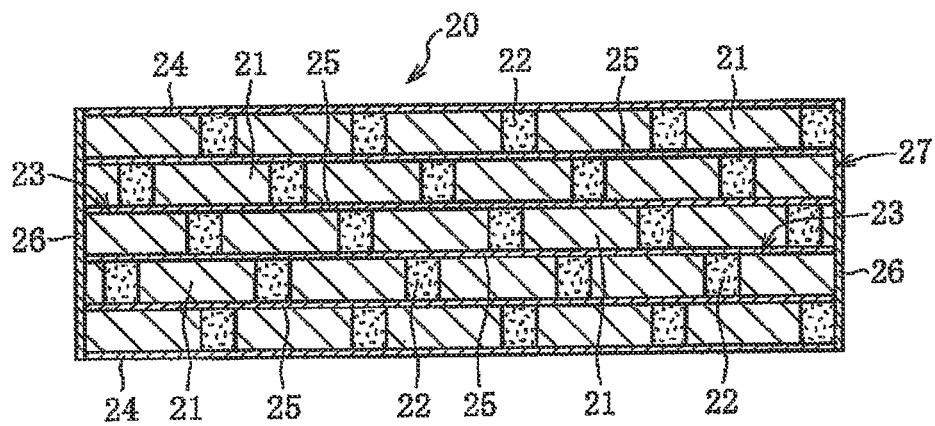
FIG. 3 is a cross-sectional view showing the overall configuration of a multilayered non-linear resistive element that is Embodiment 2 of the present invention.
Figure 4:
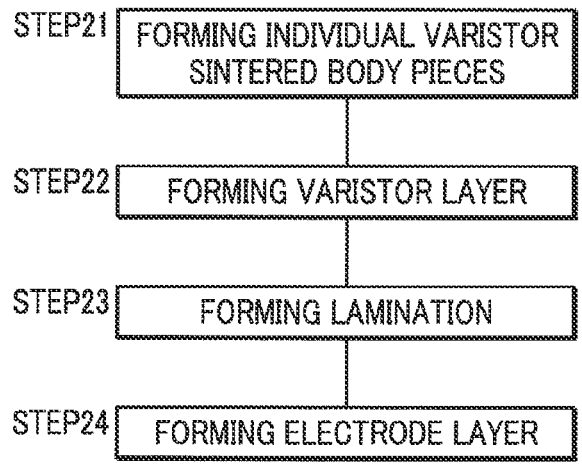
FIG. 4 is a flowchart showing the manufacturing process of the multilayered non-linear resistive element in FIG. 3.

Referring next to FIG. 3 and FIG. 4, a non-linear resistive element that is Embodiment 2 of the present invention is described below in detail.

As illustrated in FIG. 3, a multilayered non-linear resistive element 20 of Embodiment 2 is made up of a ceramic sintered body including zinc oxide (ZnO) as a primary component, and is configured so that a varistor layer 23 having main faces and an electrode layer 25 made of a conductive material are alternately laminated to form a lamination 27 and electrode layers 24 are attached on the main faces of the varistor layers 23 located at the top and the bottom of the lamination 27, where each varistor layer 23 has a sheet from where a plurality of small varistor pieces 21 having a constant thickness is aligned on a same plane and the small varistor pieces 21 are bonded to one another via insulating junctions 22. The side faces of the lamination 27 are protected all around by a covering resin material 26.

Each varistor layer 23 of this non-linear resistive element 20 including zinc oxide as a primary component is configured so that the small varistor pieces 21 having parallel planes and a constant thickness are aligned on the same plane in the horizontal and vertical directions without being overlaid in the direction perpendicular to the alignment direction of the small varistor pieces 21 and the junctions 22 are present only between the small varistor pieces 21 and are not present on the surface and the rear face of the small varistor pieces 21 so that the small varistor pieces 21 are directly joined to the electrode layers 24, 25.

The electrode layers 25 in the lamination 27 function to establish just an electrical connection between the adjacent varistor layers 23, and these layer may function to dissipate heat generated inside the element, thus suppressing local heating inside the element. In this respect, this non-linear resistive element 20 exerts more excellent performance in energy withstand capacity and aging characteristics than the conventional elements.

As is illustrated in FIG. 4, this non-linear resistive element 20 may be manufactured by the steps including: dividing a sheet member containing zinc oxide as a primary component into a predetermined size and sintering the divided pieces to form the small varistor pieces 21 having a constant thickness (STEP 21); kneading the small varistor pieces 21 and insulating resin and extruding the mixture thereof for shaping to form the sheet-form varistor layer 23 where the plurality of small varistor pieces 21 aligned on a same plane are bonded via the junctions 22 made of insulating resin (STEP 22); alternately laminating the varistor layer 23 and the electrode layer 25 made of a conductive material to form the lamination 27 (STEP 23); and forming an electrode layer 24 to each of the main face of the varistor layer 23 located at the top and the bottom of the lamination 27 for adhesion (STEP 24).

More specifically, the above-mentioned single-layered non-linear resistive element 10 and the multilayered non-linear resistive element 20 may be manufactured in the following manner.

Firstly, $Bi_2O_3$: 0.5 mol %, $Sb_2O_3$: 1.0 mol %, $Co_2O_3$: 0.5 mol %, $MnO_2$: 0.5 mol %, $Cr_2O_3$: 0.5 mol % and $Al(NO_3)$. $9H_2O$: 0.01 mol % are added to ZnO as a primary component, to which solvent and dispersant are added and mixed, and thereafter a binder is added to prepare slurry. Using this slurry, a sheet member of 60 μm in thickness is formed with a doctor blade. This sheet member is divided into 0.6 mm square pieces, and the divided pieces are sintered for 2 hours at 1,100° C. to form the small varistor pieces 11 or 21 of 0.5 mm square and 50 μm in thickness. As needed, the small varistor pieces 11 or 21 may be heat treated.

The thus obtained small varistor pieces 11 or 21 and liquidity insulating resin are kneaded and extruded for shaping. As a result, the small varistor pieces 11 or 21 of 50 μm in thickness are spaced from one another and aligned on the same plane without being overlaid in the direction perpendicular to the alignment direction of the small varistor pieces 11 or 21, and in this state, the small varistor pieces 11 or 21 are bonded via the junctions 12 or 22 made of insulating resin, thus forming a sheet-form compact. In the thus obtained sheet-form compact obtained by tape shaping using a doctor blade or an extruder, insulating resin attached to the surface thereof is removed by sandblasting using resin beads as abrasive, whereby the varistor layer 13 or 23 is prepared.

The above describes the case of preparing the varistor layer 13 or 23 using a doctor blade or an extruder, which is not a limiting example of the manufacturing method of the varistor layer 13 or 23. For instance, a plurality of small varistor pieces 11 or 21 may be spaced from one another and aligned in a die, and the spaces between the aligned plurality of small varistor pieces 11 or 21 may be filled with insulating resin (mold injection or insert molding) to form the varistor layer 13 or 23.

In the case of the single-layered non-linear resistive element 10, conductive paste including silver particles and thermoplastic resin is applied to each of the main faces of the thus obtained varistor layer 13, which is then dried to form the electrode layers 14, and such a varistor layer 13 is cut into a 10 mm square, and the covering resin material 16 is attached all around to the side faces including the cut face, whereby the single-layered non-linear resistive element 10 is finally obtained. Meanwhile, in the case of the multilayered non-linear resistive element 20, the above-mentioned conductive paste is applied to the main faces of the thus obtained varistor layer 23, which is dried to form the electrode layers 25. The plurality of varistor layers 23 are laminated and integrated by thermo-compression, and the electrode layer 24 is formed to each of the main faces of the varistor layers 23 located at the top and the bottom of the lamination 27, which is cut into a 10 mm square, and thereafter the covering resin material 26 is applied to the cut faces, whereby the multilayered non-linear resistive element 20 is finally obtained.

Herein, if the non-linear resistive element 10 or 20 can be manufactured so that the small varistor pieces 11 or 21 are not exposed to the cut faces of the varistor layer 13 or the lamination 27, there is not need to apply the above-mentioned covering resin material 16 or 26 because the insulating junctions 12 or 22 exist at the cut faces.

Both of these single-layered non-linear resistive element 10 and the multilayered non-linear resistive element 20 show excellent non-linearity that is equal to or more of that of the conventional non-linear resistive element. Additionally, similarly to the conventional non-linear resistive element, these non-linear resistive elements have a tendency to decrease leakage current over time, and so do not have practical problems.

As stated above, the varistor layer 13 or 23 formed to be a sheet-form by aligning the plurality of small varistor pieces 11 or 21 having a constant thickness on the same plane and bonding them via the junctions 12 or 22 made of insulating resin is prepared by dividing a sheet member including zinc oxide as a primary component into a predetermined size, baking the divided pieces to form the small varistor pieces 11 or 21 having a constant thickness, and kneading and extruding the small varistor pieces 11 or 21 with insulating resin for shaping. As a result, the compositional uniformity can be easily secured, and the small varistor pieces 11 or 21 free from large pores can be obtained, so that the microstructural uniformity also can be easily secured.

That is, since the small varistor pieces 11 or 21 as constitutional units of the element are manufactured by sintering the divided pieces obtained by dividing a sheet member including zinc oxide as a primary component, the sintering efficiency is high, the unevenness of density becomes less, and since the shape during sintering is small, a temperature difference between the inside and the surface part can be made small, and so residual stress in the divided pieces can be suppressed, the precision of the shape can be improved, and heat can be easily applied uniformly, so that the uniformity of a crystal structure of the grain boundary layer after heating can be secured. In this way, since the compositional or microstructural uniformity of the small varistor pieces 11 or 21 can be secured, basic performance including non-linearity, maximum energy and electricity-applied lifetime can be easily improved. As a result, the non-linear resistive element 10 or 20 capable of greatly contributing to design flexibility enlargement and energy and resources saving can be provided.

Herein, in the above descriptions of Embodiments 1 and 2, the small varistor pieces 11 or 21 are formed by sintering the divided pieces obtained by dividing a sheet-form compact into small pieces. However, the method for forming small pieces of the compact as a base of the small varistor pieces 11 or 21 is not limited to the above. For instance, granulated powder as a base of small pieces of a compact may be pressed in a die of an appropriate form for shaping.

Not only basic performance including non-linearity, maximum energy and aging characteristics but also electric characteristics such as electrostatic capacitance and a frequency characteristic thereof, a heat dissipation characteristic and mechanical strength of these non-linear resistive elements 10 and 20 can be controlled by selecting the mixture ratio of the small varistor pieces 11 or 21, the insulating resin of the varistor layer 13 or 23 and the manufacturing conditions of the small varistor pieces 11 or 21, whereby design flexibility can be enlarged. Herein, in the case of the multilayered non-linear resistive element 20, each varistor layer 23 may have different material composition of the small varistor pieces 21, mixture ratio of the small varistor pieces 21 and the insulating resin and manufacturing conditions of the small varistor pieces 21, and these varistor layers may be combined for lamination, whereby the aforementioned design flexibility can be enlarged.

The mixture ratio of the small varistor pieces 11 or 21 and the insulating resin may be controlled in accordance with the element characteristics. When a small and high energy withstand element is to be manufactured, the mixture ratio of the small varistor pieces 11 or 21 may be increased, and when the flexibility of the element is required, the small varistor pieces 11 or 21 may be decreased. Among the manufacturing conditions of the small varistor pieces 11 or 21, it is basically important to manufacture the small varistor pieces 11 or 21 having compositional and microstructural uniformity, and in order to suppress the unevenness of density during shaping and facilitate to make heating during sintering and vaporizing of $Bi_2O_3$ uniform, it is desirable to embed a small and thin compact (green body) (for example, in the case of a rectangle, 10 mm square×2 mm thickness or less, and in the case of a circle, 10 mm diameter×2 mm thickness or less) in powder having a composition similar to that of the varistor or to sinter while rotating the compact (green body) for uniform heating. Moreover, needless to say, in order to improve the performance of the element, it is desirable that additive is added to ZnO for mixture to improve the compositional uniformity of the small varistor pieces 11 or 21, followed by pre-sintering at 800° C. to 1,000° C., which is pulverized, and then binder is added to the pulverized pieces to form slurry and the slurry is shaped into a sheet form.

The thus enlarged design flexibility enables the performance that cannot be achieved by the conventional element, i.e., the characteristic of low varistor voltage and excellent maximum withstand energy. Since the varistor voltage depends on the number of grain boundaries, the thickness of the non-linear resistive element has to be decreased to lower the varistor voltage. On the other hand, the volume of the non-linear resistive element has to be increased to increase the maximum withstand energy. Accordingly, in order to obtain the characteristic of low varistor voltage and excellent maximum withstand energy, the non-linear resistive element has to have a large area and be thin. In the case of the conventional non-linear resistive element, however, the compact is deformed during sintering and contraction in the sintering process, and therefore in order to obtain an element that is thin and has a large area, deformation during contraction becomes excessive, which causes cracking after sintering or large mechanical distortion, and the yield at the sintering process may be degraded greatly.

On the other hand, since the non-linear resistive element 10 includes the varistor layer 13 where the small varistor pieces 11 are bonded via the insulating junctions 12, the element obtained can easily realize a thinner layer and a larger area, can be designed to cope with large current and has excellent precision in shape.

Herein, since the multilayered non-linear resistive element 20 includes the lamination of the varistor layers 23 each having a defined varistor voltage, the varistor voltage of the element as a whole can be decided simply by adjusting the number of laminated layers.

Exemplary material compositions of the small varistor pieces 11 or 21 include not only $Bi_2O_3$ non-linear resistive elements 10 and 20 including zinc oxide as a primary component with $Bi_2O_3$ added thereto but also $Pr_6O_{11}$, $BaTiO_3$, $SrTiO_3$, $TiO_2$, $SnO_2$ and $Fe_3O_4$ non-linear resistive elements 10 and 20. The above embodiments describe the case of the small varistor pieces 11 and 21 as the sintered body including zinc oxide as a primary component. Alternatively, they may be ceramic having a non-linear electric resistive characteristic such as strontium titanate, silicon carbide and tin oxide.

The small varistor pieces 11 and 21 may have a planar shape that is not only a square but also other rectangles such as a rectangle and polygons or circles such as an ellipse and a perfect circle. Some tape shaping methods such as using a doctor blade and an extruder, however, require the shape that is suitable to alignment of the small varistor pieces 11 and 21 on the same plane without being overlaid. Rectangles can lead to higher density of alignment and arrangement than circles, and therefore rectangles are effective to manufacture non-linear resistive elements 10 and 20 that are small and have high maximum withstand energy.

The ratio of a shorter dimension between the vertical side and the horizontal side of a rectangle to the thickness (aspect ratio) or in the case of a perfect circle, a ratio of the diameter to the thickness (aspect ratio) is preferably larger, and the aspect ratio required is 2 or more at least, and desirably 5 or more. Since the small varistor pieces 11 and 21 can be manufactured by dividing a thin sheet member into any size, the sheet member may be divided so as to have the above-mentioned optimum aspect ratio.

When the size of the small varistor pieces 11 and 21 is too small, it becomes difficult to manufacture the small varistor pieces 11 and 21. Conversely a too large size will cause compositional or microstructural non-uniformity of the small varistor pieces 11 or 21 and leads to a decrease in the number of the small varistor pieces 11 and 21 included in the non-linear resistive elements 10 and 20, causing not only insufficient uniformity of the non-linear resistive elements 10 and 20 as a whole but also difficulty in kneading with insulating resin, and therefore the following size is desirable.

For both of the non-linear resistive element 10 and the non-linear resistive element 20, the size that is suitable to alignment of the small varistor pieces 11 and 21 on the same plane without being overlaid by the aforementioned tape shaping methods is, in the case of rectangular small varistor pieces 11 and 21, 50 µm or more in the shortest side dimension and 1 mm or less in the longest side dimension, desirably 100 µm or more in the shortest side dimension and 500 µm or less in the longest side dimension. In the case of circular small varistor pieces 11 and 21, the suitable size is 50 µm to 1 mm in diameter, desirably 100 to 500 µm.

Considering the aforementioned aspect ratio, the small varistor pieces 11 and 21 have a thickness of 25 to 500 µm, desirably about 50 to 200 µm. As the size of these small varistor pieces 11 and 21 becomes smaller, the basic performance becomes improved, characteristic variation becomes smaller and stability for manufacturing becomes higher, and therefore an optimum value may be selected within the aforementioned range.

The plurality of small varistor pieces 11 and 21 can be shaped into a sheet form so as to be aligned on the same plane without being overlaid using a method other than the aforementioned tape shaping methods. For instance, the small varistor pieces 11 and 21 may be aligned using a mounter for small electronic components or the like, and thereafter insulating resin may be poured thereto for shaping into a sheet form. In that case, since the small varistor pieces 11 and 21 may be a size that can be handled by the mounter, rectangular small varistor pieces 11 and 21 may be 0.2 mm or more in the shortest side dimension and 0.4 mm or more in the longest side dimension, and circular small varistor pieces 11 and 21 may be 0.4 mm or more in diameter.

In this case, the size of the small varistor pieces 11 and 21 required to keep the compositional and microstructural uniformity is limited, and 10 mm or less in the longest side dimension is preferable for rectangles and 10 mm or less in diameter is preferable for circles. The manufacturing method of the small varistor pieces 11 and 21 is not always limited to the aforementioned tape shaping methods, and when a small element is to be manufactured, a die may be used for shaping because variations in the density distribution during shaping and temperature distribution during sintering can be suppressed.

The method for removing the insulating resin attached to the surface of the sheet-form compact obtained by the tape shaping methods is not limited to sandblasting, and the insulating rein may be removed by dissolving using appropriate solution, for example. When the small varistor pieces 11 and 21 are positioned for alignment using a mounter for small electronic components or the like, resist may be used as insulating adhesive, and the resist on the small varistor pieces 11 and 21 may be removed by photo-etching.

The insulating resin to bond the aforementioned small varistor pieces 11 and 21 used may be a resin material having excellent flame retardancy, heat resistance and thermal conductivity, whereby thermal properties and electrical performance can be improved. In addition to the selection of these resin materials, various additives may be effectively added to improve flame retardancy, heat resistance and thermal conductivity. For instance, oxides of alumina, aluminum nitride, boron nitride and the like and non-oxides, particles obtained by insulation-processing of the surface of thermal-conductive particles (this may be metal or non-metal compounds), and conductive particles in some cases may be added within the range of not degrading the insulating property. When the insulating resin attached to the surface of the sheet-form compact (green body) is removed by sandblasting during the element manufacturing process, the sandblasting efficiency can be improved by selecting the resin material of the insulating resin and various additives.

For the electrode layers 14, 24 and 25, room temperature setting conductive adhesive including silver as conductive particles and other thermal-setting type conductive adhesive may be used. As the conductive particles, not only silver but also copper, gold or carbon may be used, for example. Exemplary methods to form these electrode layers 14, 24 and 25 include chemical electrode formation such as plating, physical electrode formation such as evaporation or sputtering, and application and burning of nano-sized silver particles. From the aspect to prevent burnout of the non-linear resistive elements 10 and 20, the adhesive to make up the electrode layers 14 and 24 used may be resin having a fuse function so as to sharply increase the resistance with the temperature. Instead of the fuse function provided to the electrode layers 14 and 24, a layer including small sintered body pieces of a positive characteristic thermistor (PTC thermistor) may be bonded to one of or both of the faces of the non-linear resistive elements 10 and 20 via the electrode layers 14 and 24.

Herein, the multilayered non-linear resistive element 20 has the structure where the electrode layer 25 intervenes in the lamination 27, and this electrode layer 25 may have a function to dissipate heat generated inside the element so that local heat generation inside the element can be suppressed. To this end, the electrode layer 25 may be made of conductive resin including additive to improve heat resistance. The thickness of the electrode layers 25 may be designed so as to improve heat radiation property of the element as a whole or the electrodes 25 each may have a different thickness so as to suppress local heat generation for optimization.

Note here that the resin included in the non-linear resistive elements 10 and 20, e.g., insulating resin may be resin having a property of changing a color by the application of heat. Thereby, whether serge voltage is applied or not or the degree of element deterioration can be checked visually, and there is large practical value to judge the timing to replace the element. In this case, when the electrode layers 14 and 24 are transparent electrodes made of ITO (tin-doped indium oxide), for example, formed by physical electrode formation such as evaporation or sputtering, visual checking can be performed easier.

Figure 5:
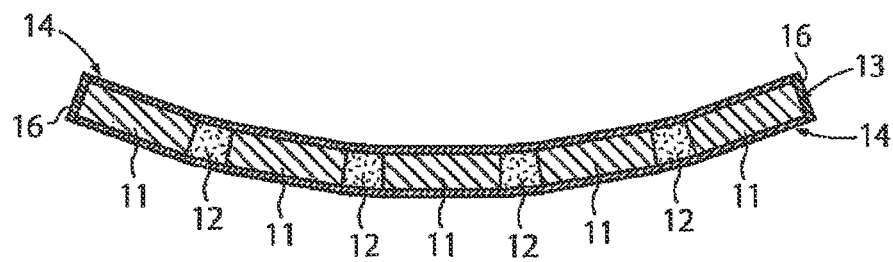
FIG. 5 is a cross-sectional view showing the overall configuration of a non-linear resistive element that is Embodiment 3 of the present invention.
Figure 6:
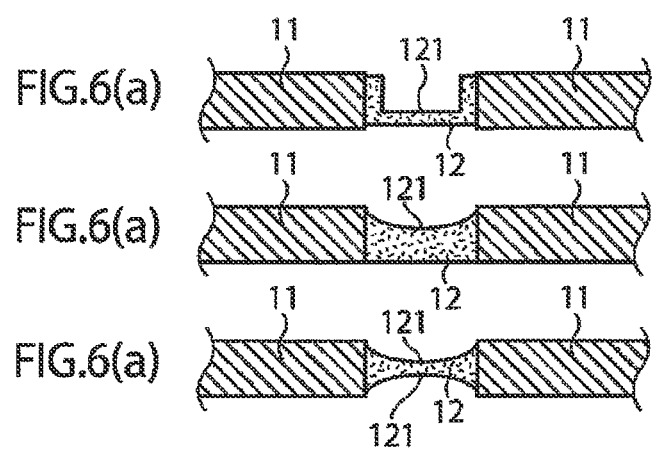
FIG. 6 is a cross-sectional view showing junctions of a non-linear resistive element that is Embodiment 4 of the present invention.
Figure 7:
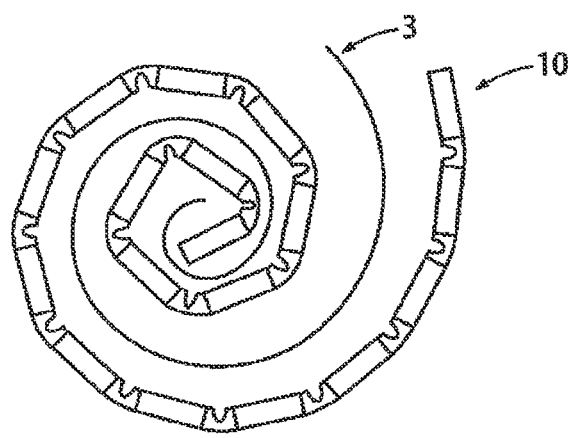
FIG. 7 explains a state where the non-linear resistive element in FIG. 6 is wound in a spiral form.

Referring next to FIGS. 5 to 7, non-linear resistive elements that are Embodiments 3 and 4 of the present invention are described below in detail.

The same reference numerals are assigned to the configuration similar to that in FIG. 1, and their descriptions are omitted. Non-linear resistive elements 10 in Embodiments 3 and 4 are different only in the structure of junctions 12 to bond the small varistor pieces 11 in the above Embodiment 1.

Junctions 12 in Embodiment 3 include insulating resin having flexibility that can bend elastically, in addition to flame retardancy, heat resistance and thermal conductivity. For instance, desirably it may be synthetic resin such as urethane elastomers or olefin elastomers.

As a result, as indicated in the arrow in FIG. 5, even when external force is applied to the varistor layer 13, the varistor layer 13 can bend due to the elastic force of the junctions 12. Therefore, the external force can be received by the varistor layer 13 as a whole. As a result, resistance to external force of the varistor layer 13 can be improved.

Junctions 12 in Embodiment 4 are made of insulating resin having excellent flexibility similarly to Embodiment 3, and as illustrated in FIG. 6 are further provided with concaves 121 formed on the inside of the junction interfaces (connecting interface) with the small varistor pieces 11. These concaves 121 may be formed by removing the junctions 12 by sandblasting or the like. When the varistor layers 13 and 23 are formed by injection molding or insert molding, a die configured to form the concaves 121 at the junctions 12 may be used.

The concaves 121 have a thickness smaller than that of the junction interfaces between the small varistor pieces 11 and the junctions 12. With this configuration, the junctions 12 have larger elasticity than that of the junctions 12 in Embodiment 3, so that the varistor layer 13 as a whole can bend.

Such a configuration enables assembly of the element at a space where the conventional integrally sintered ceramic sintered body cannot be assembled, by changing the form of the varistor layer 13 so as to fit to the space. For instance, as illustrated in FIG. 7, the varistor layer 13 and an insulating sheet 3 may be overlaid and wound in a spiral form as in a capacitor. As a result, the varistor layer 13 can be dealt with easily during assembly and the convenience can be improved.

Note here that the concaves 121 have any shape that can enhance the elasticity of the junctions 12. For instance, as illustrated in FIG. 6(a), they may be in a rectangular form, as illustrated in FIG. 6(b), they may be in a round form, or as illustrated in FIG. 6(c), the concaves 121 may be formed at both of the surface and the rear face of the junctions 12.

Although Embodiments 3 and 4 describe a single-layered non-linear resistive element, they may be a multilayered non-linear resistive element, from which the effects of the present invention can be obtained.

The present invention is not limited to the aforementioned embodiments, and may be embodied in other specific forms without departing from the scope thereof. The present invention is indicated by the claims, and all changes which come within the meaning and range of equivalency of the claims are intended to be embraced therein.

DESCRIPTION OF REFERENCE NUMERALS 10, 20 non-linear resistive element
11, 21 small varistor piece
12, 22 junction
13, 23 varistor layer
14, 24, 25 electrode layer

The invention claimed is:

1. A non-linear resistive element, comprising: a varistor layer in a sheet form having a surface and a rear face that are parallel to each other; and conductive electrode layers joined to the each of the surface and the rear face of the varistor layer, wherein
the varistor layer includes: a plurality of small varistor pieces that are made of a ceramic sintered body and are spaced from one another for alignment, each small varistor piece having a surface and a rear face coinciding with the surface and the rear face of the varistor layer, respectively; and insulating junctions that join the adjacent small varistor pieces.

2. The non-linear resistive element according to claim 1, wherein a plurality of the varistor layers and the electrode layers are alternately laminated in a direction perpendicular to each of the surface and the rear face of the varistor layer.

3. The non-linear resistive element according to claim 1, wherein the junctions comprise synthetic resin having elasticity.

4. The non-linear resistive element according to claim 3, wherein the junctions have a part of a thickness smaller than a thickness of a junction interface with the small varistor pieces.

5. The non-linear resistive element according to any one of claims 1, wherein the electrode layers are provided with a metal fitting for electric connection with others.

6. The non-linear resistive element according to any one of claims 1, wherein both end faces of the varistor layer and the electrode layers are covered with a covering resin material.

7. A method for manufacturing the non-linear resistive element according to claim 1, comprising the steps of:
sintering a plurality of small pieces of a compact as base of ceramic to form the plurality of small varistor pieces having a same thickness;
kneading the plurality of small varistor pieces and insulating resin and extruding mixture thereof for shaping to form the sheet-form varistor layer where the plurality of small varistor pieces are spaced from one another and aligned, and the adjacent small varistor pieces are bonded via the insulating resin so that the surface and the rear face of the small varistor pieces coincide with the surface and the rear face of the varistor layer, respectively; and
forming the conductive electrode layers so as to be joined to the each of the surface and the rear face of the varistor layer.

8. A method for manufacturing the non-linear resistive element according to claim 2, comprising the steps of:
sintering a plurality of small pieces of a compact as base of ceramic to form the plurality of small varistor pieces having a same thickness;
kneading the plurality of small varistor pieces and insulating resin and extruding mixture thereof for shaping to form the sheet-form varistor layer where the plurality of small varistor pieces are spaced from one another and aligned, and the adjacent small varistor pieces are bonded via the insulating resin so that the surface and the rear face of the small varistor pieces coincide with the surface and the rear face of the varistor layer, respectively;
alternately laminating a plurality of the varistor layers and the conductive electrode layers in a direction perpendicular to each of the surface and the rear face of the varistor layer to form a lamination; and
forming the electrode layers so as to be joined to each of the surface and the rear face of the lamination.

* * * * *